US009823688B2

(12) United States Patent
Rajagopal et al.

(10) Patent No.: US 9,823,688 B2
(45) Date of Patent: Nov. 21, 2017

(54) LEVEL BALANCED CLOCK TREE

(71) Applicant: Apple Inc., Cupertino, CA (US)

(72) Inventors: Karthik Rajagopal, Mountain View, CA (US); Narayanan V. Thondugulam, Sunnyvale, CA (US); Rahul Sharma, Milpitas, CA (US)

(73) Assignee: Apple Inc., Cupertino, CA (US)

( * ) Notice: Subject to any disclaimer, the term of this patent is extended or adjusted under 35 U.S.C. 154(b) by 331 days.

(21) Appl. No.: 14/681,599

(22) Filed: Apr. 8, 2015

(65) Prior Publication Data
US 2016/0299524 A1 Oct. 13, 2016

(51) Int. Cl.
  *G06F 17/50* (2006.01)
  *G06F 1/10* (2006.01)
(52) U.S. Cl.
  CPC .............. *G06F 1/10* (2013.01); *G06F 17/505* (2013.01); *G06F 2217/62* (2013.01)
(58) Field of Classification Search
  CPC ....... G06F 1/10; G06F 17/505; G06F 2217/62
  See application file for complete search history.

(56) References Cited

U.S. PATENT DOCUMENTS

| 6,536,024 B1 | 3/2003 | Hathaway |
| 7,543,204 B2 | 6/2009 | Fredrickson et al. |
| 2010/0225353 A1* | 9/2010 | Chang ................. G06F 1/10 326/93 |
| 2010/0231282 A1* | 9/2010 | Singasani ............. G06F 1/10 327/297 |

OTHER PUBLICATIONS

"Clock-Tree Power Optimization based on RTL Clock-Gating", Donno et al., Jun. 2003, pp. 622-627.

* cited by examiner

*Primary Examiner* — Nha Nguyen
(74) *Attorney, Agent, or Firm* — Meyertons, Hood, Kivlin, Kowert & Goetzel, P.C.; Erik A. Heter

(57) ABSTRACT

A method for designing a clock tree is disclosed. In one embodiment, a preliminary clock tree design for an integrated circuit (IC) is processed. The clock tree includes a root node, a number of intermediate levels, and a leaf level that is coupled to a number of clocked circuits. Clock gating circuits are placed at the leaf level of the clock tree, and at least some of the intermediate levels. Processing the preliminary clock tree design includes ensuring that an equal number of clock gating circuits are coupled between each leaf level clock gating circuit and the root node. After processing the preliminary clock tree design, clock tree synthesis is performed by executing a clock tree synthesis tool on a computer system to generate a synthesized clock tree design.

20 Claims, 7 Drawing Sheets

LEVEL BALANCED CLOCK TREE

BACKGROUND

Technical Field

This disclosure is directed to the design of integrated circuits, and in particular, the design of clock distribution networks.

Description of the Related Art

Integrated circuits (ICs) often include at least one clock distribution network, sometimes referred to as a clock tree, for distributing a clock signal to clocked circuits. A generated clock signal may be provided to a root node at a root level of the clock tree and distributed through a number of branches. At the end of each branch is are leaf nodes at a leaf level of the clock tree. From each leaf node, the clock signal is provided to one or more clocked circuits. In between the root level and the leaf level may be one or intermediate levels.

Clock gating circuits may be implemented at each of the various levels of a clock tree. The clock gating circuits may be uses to selectively inhibit or enable the clock signal from passing to the next level of the clock tree, and ultimately to the clocked circuits. Inhibiting the clock signal using clock gating circuits may be performed when certain clocked circuits are idle or otherwise not performing useful work. This may in turn result in power savings.

In additional to having clock gating circuits at various levels of the clock tree, inverters and/or buffers may also be implemented. The implementation of inverters and/or buffers in various branches of the clock tree adjust the timing skew of that particular branch such that the clock signal is provided from each of the leaf nodes at substantially the same time.

SUMMARY

A method for designing a clock tree is disclosed. In one embodiment, a preliminary clock tree design for an integrated circuit (IC) is processed. The clock tree includes a root node coupled to receive a clock signal from a clock generation circuit, a number of intermediate levels, and a leaf level that is coupled to a number of clocked circuits. Clock gating circuits are placed at the leaf level of the clock tree, and at least some of the intermediate levels. Processing the preliminary clock tree design includes ensuring that an equal number of clock gating circuits are coupled between each leaf level clock gating circuit and the root node. After processing the preliminary clock tree design, clock tree synthesis is performed by executing a clock tree synthesis tool on a computer system to generate a synthesized clock tree design.

In one embodiment, a clock tree includes a root level, a number of intermediate levels, and a leaf level having a number of leaf nodes. Clock gating circuits may be implemented at each of the leaf nodes, and may also be implemented at the root node and at least some of the intermediate levels. The clock tree may be arranged such that each branch thereof (beginning at the root node and culminating at a leaf node) includes an equal number of clock gating circuits implemented thereon. Furthermore, the clock tree may be also arranged such that the clock gating circuits at each leaf node are coupled to provide the clock signal to at least a minimum number of clocked circuits and no more than a maximum number of clocked circuits. Similarly, clock gating circuits at the intermediate levels may be coupled to provide the clock signal to at least minimum number of next level clock gating circuits and no more than a maximum number of next level clock gating circuits. This may provide some balance to the fan-out for clock gating circuits at the various levels. Certain ones of the clock gating circuits may be modified to be always active during operation of the IC.

BRIEF DESCRIPTION OF THE DRAWINGS

The following detailed description makes reference to the accompanying drawings, which are now briefly described.

Figure 1:
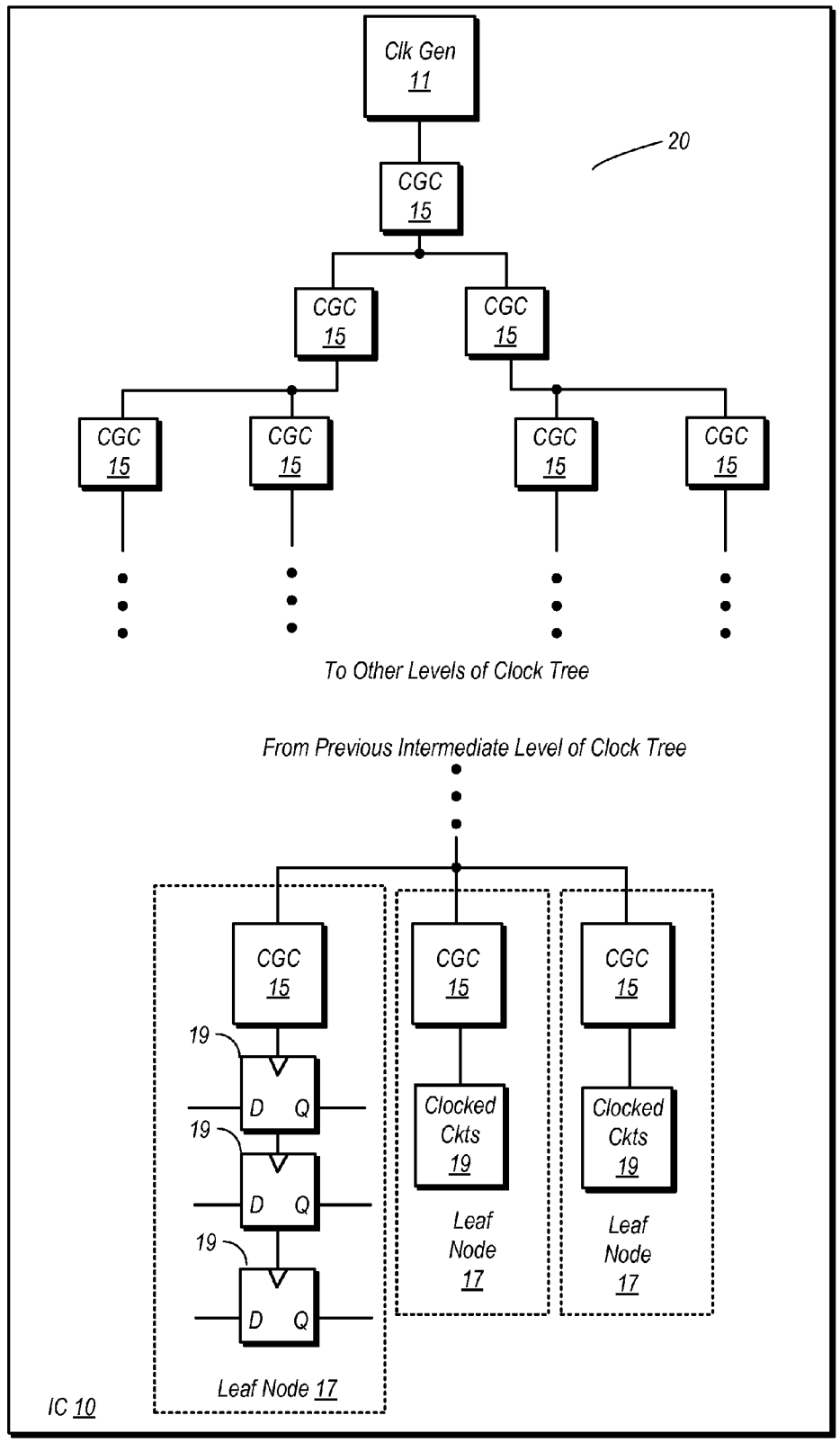
FIG. 1 is an illustration of one embodiment of an IC having a clock tree.

While the disclosed subject matter is susceptible to various modifications and alternative forms, specific embodiments thereof are shown by way of example in the drawings and will herein be described in detail. It should be understood, however, that the drawings and detailed description thereto are not intended to limit the subject matter to the particular form disclosed, but on the contrary, the intention is to cover all modifications, equivalents and alternatives falling within the spirit and scope of the disclosed subject matter as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits and/or memory storing program instructions executable to implement the operation. The memory can include volatile memory such as static or dynamic random access memory and/or nonvolatile memory such as optical or magnetic disk storage, flash memory, programmable read-only memories, etc. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph (f) (or pre-AIA paragraph six) interpretation for that unit/circuit/component.

DETAILED DESCRIPTION OF EMBODIMENTS

Turning now to FIG. 1, a diagram illustrating one embodiment of a clock tree that may be implemented on an IC 10 is shown. Clock tree 20 in the embodiment shown is used to distribute a clock signal to a number of difference clocked circuits 19 that form the various functional circuitry of IC 10. In the illustrated embodiment, clock generator 11 is configured to generate a clock signal that is conveyed to the root clock signal node, via a number of clock gating circuits 15. Clock generator 11 may be any suitable type of clock generating circuit, such as a phase locked loop (PLL) or a ring oscillator, among other examples.

The root clock signal may be distributed through various instances of a coarse clock gating circuit 15. The clock gating circuit 15 coupled to receive the root clock signal from clock generating circuit 11 is defined herein as being at the root level of the clock tree, and at the root node of the clock tree. Additional levels of clock gating circuits 15 are present at intermediate levels, which may branch out and distribute the clock signal to various additional clock gating circuits at additional levels.

A final level of the clock tree 20 is a leaf level including a number of clock gating circuits 15 coupled to leaf nodes 17. The clock signal may be distributed from each leaf level clock gating circuit 15 to a number of different clocked circuits 19, which make up the various leaf nodes 17.

Various configurations may be used to implement the clock gating circuits 15. In one exemplary embodiment, a clock gating circuit 15 may be implemented using an AND gate, with a first input receiving the clock signal and a second input receiving an enable signal. When the enable signal is asserted, the output of the AND gate follows the clock signal. Other embodiments having more complex implementations are also possible and contemplated. In some embodiments of a clock tree, each clock gating circuit 15 at a given level of the clock tree may be substantially identical, meaning they are implemented using the same logic circuitry and the same transistor configuration. Embodiments in which all clock gating circuits 15 are implemented using the same logic and transistor configurations are also possible. Making the clock gating circuits 15 identical at each level of the clock tree, or throughout the clock tree as a whole may result in more consistent performance across various process, voltage, and temperature conditions.

The clock gating circuits 15 in clock tree 20 may be configured to selectively enable or inhibit the clock signal from passing to the next level, or to the clocked circuits 19. Although not explicitly shown, IC 10 may include a power management circuit or a clock control circuit configured to selectively enable/disable various ones of the clock gating circuits 15. Selectively disabling various ones of the clock gating circuits 15 may be performed to reduce power consumption when various functional units (or portions thereof) including various instances of clocked circuits 19 are idle. However, as is discussed below, selected ones of the clock gating circuits 15 may be arranged to be always enabled during operation of IC 10.

Clock tree 20 may be designed in a manner to balance various factors, such as skew between various branches, loads from clock gating circuits, and so forth. To this end, certain design principles may be followed. A first design principle is that clock gating circuits may be used to provide all gate delays between a root clock node and each of the leaf nodes. Thus, in contrast to prior art clock tree embodiments, at least some embodiments of clock tree 20 may be implemented without using buffers and/or inverters to provide delay in the various clock signal paths to equalize the clock skew there between. In embodiments where buffers and/or inverters are implemented, they may be placed in the same levels as other buffers/inverters, and may further by implemented using identical circuit configurations.

A second principle is to design the clock tree such that an equal number of clock gating circuits 15 are implemented between each leaf node and the root node. When the clock gating circuits 15 at each level are substantially identical to one another, or identical throughout the clock tree 20, the number of gate delays in each path (from root to leaf) may be the same and the skew between these paths may be minimized. Some of the clock gating circuit 15 in a given path may not be necessary for gating purposes and may thus be arranged to be always active (i.e. always transparent to the clock signal) during operation of IC 10. For example, if clock gating circuits 15 are implemented using only an AND gate, the enable input may be hardwired to a power supply voltage node such that its output follows the clock signal whenever IC 10 is operating.

A third principle is to perform at least some equalization of the fan-out of the various clock gating circuits by limiting the number of next level circuits driven to a particular range. For example, each leaf level clock gating circuit may be configured within IC 10 to drive between 8 and 12 clocked circuits (the numbers used here are for the sake of illustrating the concept, but may be significantly different in actual practice). Similarly, each intermediate clock gating circuit may be configured within IC 10 to drive between 8 and 12 next level clock gating circuits. Designing the clock tree in this manner may provide some degree of uniformity to the fan-out of each clock gating circuit, thus preventing situations where one clock gating circuit drives only a few next level circuits (more clock gating circuits or clocked circuits at the leaf level) while another clock gating circuit drives hundreds of circuits. In some embodiments, the uniformity may be enforced on a level-by-level basis. For example, the range of the number of circuits driven by each leaf level clock gating circuit may be more tightly restricted than for intermediate level clock gating circuits. Enforcing at least some fan-out uniformity at each level of the clock tree may further aid in minimizing the skew in the respective paths between each leaf node and the root node.

Additional criteria may also be considered in the design of a clock tree in accordance with this disclosure. For example, a distance metric, captured as a half-perimeter of a rectangle of the immediate fan-outs of a clock gating circuit, clock gating circuit pin load, clock gating circuit driving ability, clock gating circuit transition time (particularly at lower levels of the clock tree and clocked circuits receiving the clock signal), and so forth.

Figure 2:
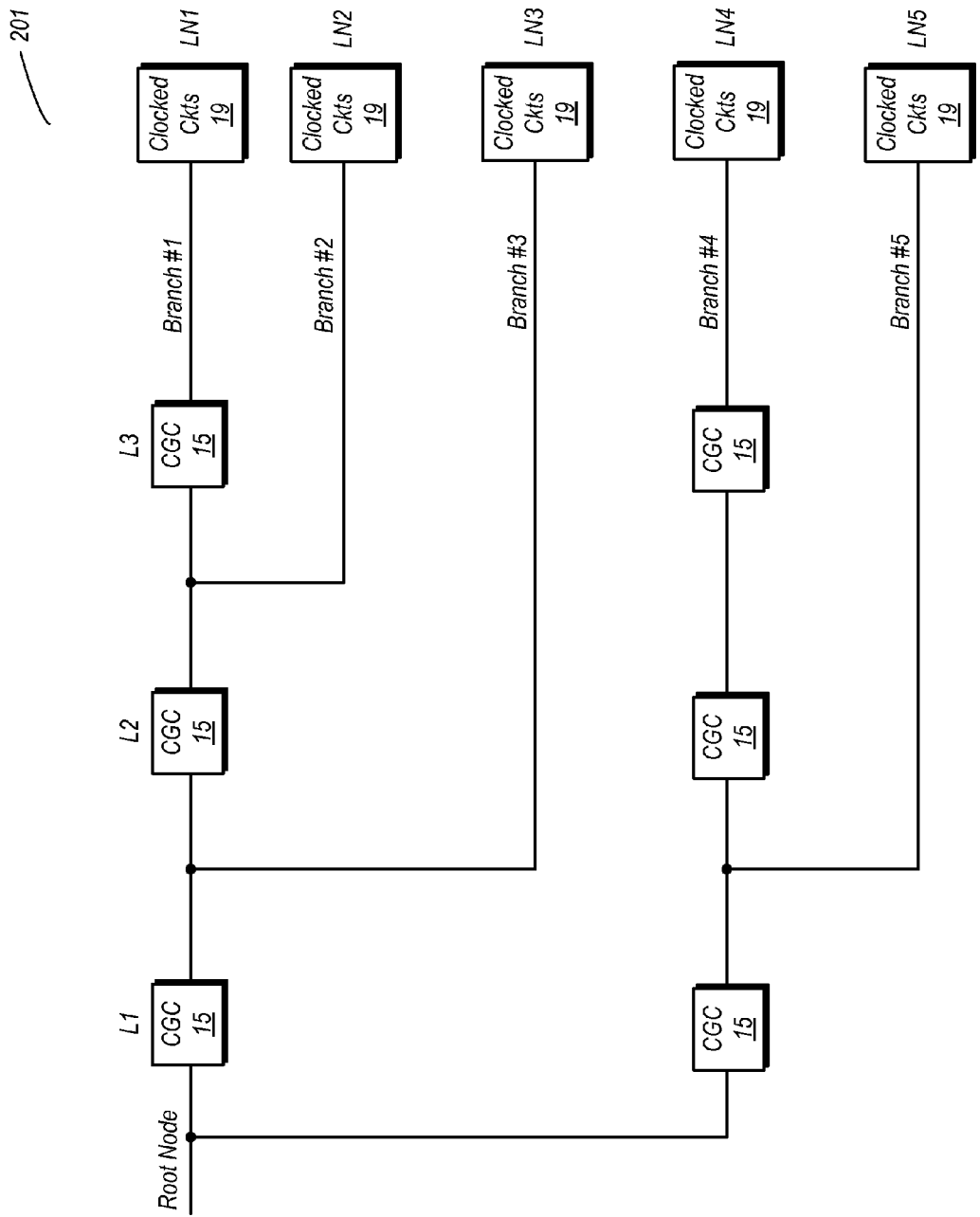
FIG. 2 is a diagram of one embodiment of a clock tree design prior to processing.

FIGS. 2-5 illustrate various aspects of the design process for achieving a clock tree in accordance with the principles discussed above. Turning now to FIG. 2, an example of a simplified preliminary clock tree design is shown. In the illustrated example, clock tree 201 is a pre-synthesis design (i.e. clock tree synthesis has not yet been performed). Five different branches, or root-to-leaf paths, are shown. Clock tree 201 includes three levels, L1, L2, and L3, with the first two being intermediate levels and L3 being the leaf level. Portions of some root-to-leaf paths may share a common branch. For example, Branch #2 and Branch #3 of clock tree 201 extends from Branch #1, and thus the root-to-leaf paths for each of leaf level clock gating circuits 15 coupled to leaf nodes LN1, LN2, and LN3 share portions of the same path.

In this preliminary design, the number of clock gating circuit 15 between the root nodes and each of the leaf nodes is not equalized. Between leaf node LN1 and the root node there are three clock gating circuits 15, as well as between LN4 and the root node. There is only one clock gating circuit 15 between each of leaf nodes LN3 and LN5. Between LN2 and the root node, there are two clock gating circuits 15. If left in this configuration, the skew between each of the various root-to-leaf paths may vary significantly.

Figure 3:
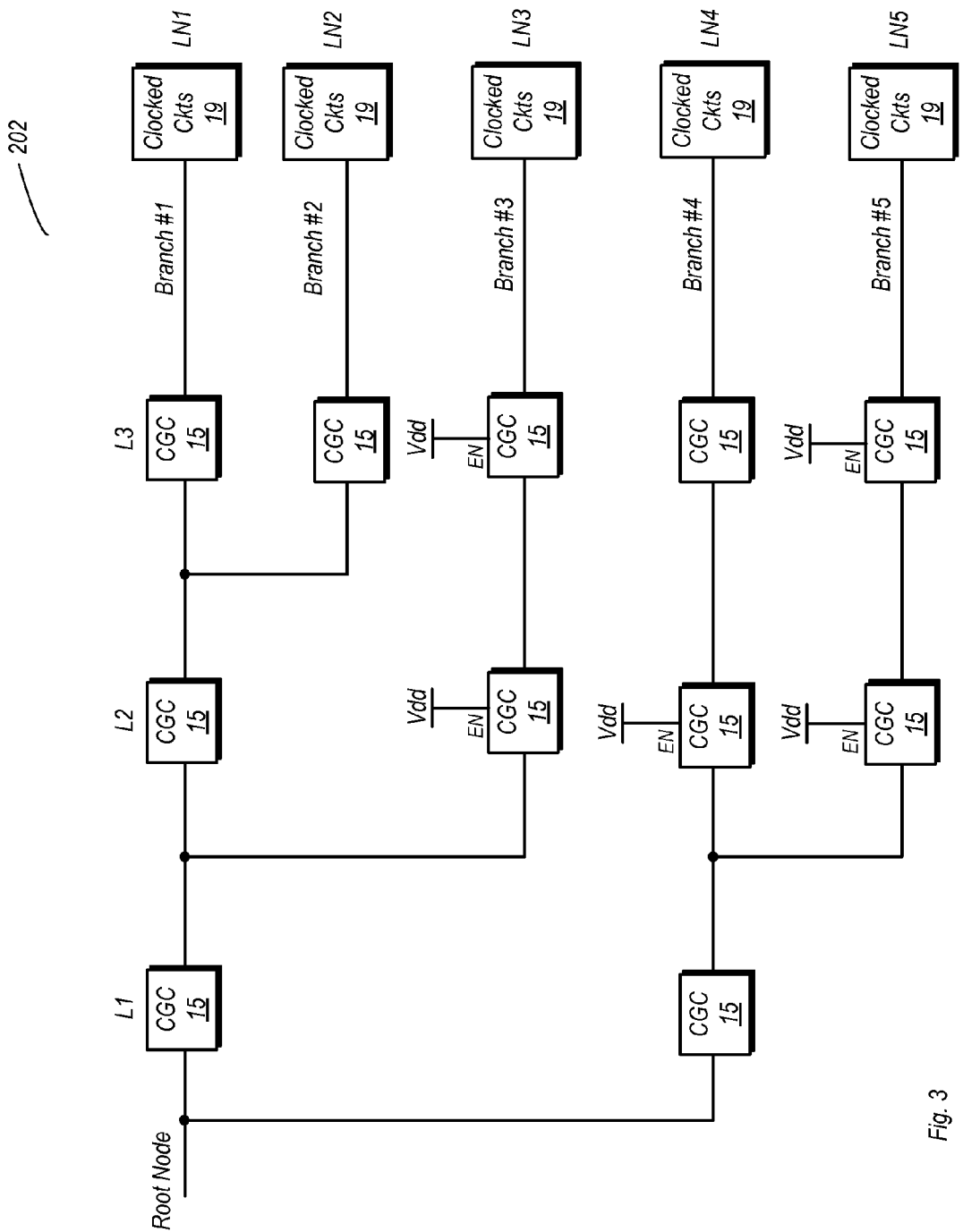
FIG. 3 is a diagram illustrating the distribution and power configuration of clock gating circuits for one embodiment of a clock tree design following processing.

FIG. 3 illustrates a version of the preliminary clock tree design after modification to ensure that each root-to-node path includes an equal number of clock gating circuits 15. In preliminary clock tree design 202, the prior version of the preliminary design has been modified to add clock gating circuits 15 in Branches #2, #3, and #5. As such, the number of clock gating circuits between each leaf node LN1-LN5 and the root node is three. Providing additional clock gating circuits 15 in Branches #2, #3, and #5 results in an equal number of gate delays in each root-to-node path, and thus minimizes the clock skew between the leaf nodes LN1-LN5. Furthermore, particular ones of the clock gating circuits 15 in Branches #3, #4, and #5 are not needed for actual clock gating purposes, and thus have an enable input tied directly to supply voltage node Vdd. Accordingly, the clock gating circuits 15 that have their respective enable inputs tied to Vdd are enabled whenever IC 10 is operating and/or whenever Vdd is energized to an intended operating voltage.

It is further noted that in the modified preliminary design of clock tree 202, no inverters or buffers are provided in any of the root-to-leaf paths. Accordingly, all of the gate delays applied to the clock signal, irrespective of path, are provided by clock gating circuits. Clock gating circuits 15 may respond to process, voltage, and temperature variations differently than inverters and/or buffers. Accordingly, by utilizing only clock gating circuits 15 to provide the gate delays in the various paths, more uniform tracking over varying conditions may be achieved. Nevertheless, embodiments are possible and contemplated in which a clock tree may include inverters and/or buffers. In such cases, the inverters may be implemented in the same levels of the clock tree, and further, may be implemented using circuit configurations that are substantially identical to one another.

Figure 4:
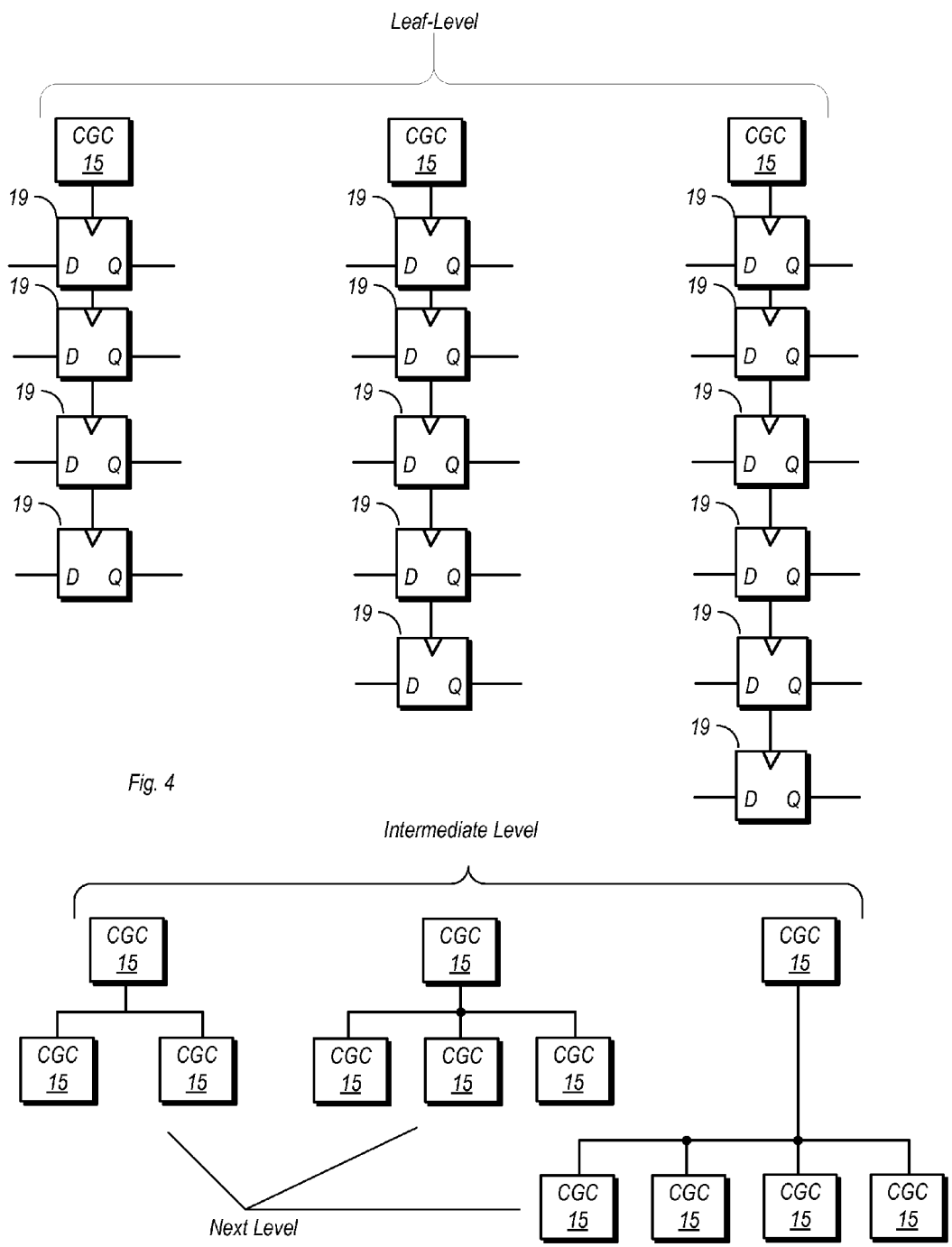
FIG. 4 is a diagram illustrating the distribution of fan-out for clock gating circuits at the leaf level and an exemplary intermediate level for one embodiment of a clock tree design.

FIG. 4 illustrates another aspect of the design of a clock tree according to the disclosure. In particular, FIG. 4 is directed to providing a level of uniformity to the fan-out of the various clock gating circuit 15 to further minimize clock skew between the various leaf nodes. The upper portion of FIG. 4 shows three different leaf level clock gating circuits 15, with a fan-out range restricted to a range of 4-6 clocked circuits 19. Thus, a first leaf level clock gating circuit 15 has a fan-out of four clocked circuits 19, a second has a fan-out of five clocked circuits 19, and a third has a fan-out of six clocked circuits 19. As noted above, the specific fan-out numbers shown here are for illustrative purposes, while the actual numbers used in practice may vary considerably from one embodiment to another.

The lower portion of FIG. 4 illustrates exemplary fan-out ranges for three different intermediate level clock gating circuits 15. A first intermediate level clock gating circuit 15 has a fan-out of two next-level clock gating circuits 15, a second has a fan-out of three, while a third has a fan-out of four, with the range being between two and four. Again, these numbers are for illustrative purposes, but may vary in practice. The next level clock gating circuits may be additional clock gating circuits at another intermediate level, or may be leaf level clock gating circuits.

As discussed above, the fan-out range requirements may vary from one level to the next. For example, the fan-out range requirements may be more relaxed for levels closer to the root node, while stricter requirements may be applied to levels closer to the leaf nodes. The leaf nodes may have the strictest fan-out range requirements in some embodiments. In an exemplary embodiment, the leaf level clock gating circuits may have a fan-out in a range of ±5% of a selected number (rounded to an integer value). Clock gating circuits at an intermediate level above the leaf level may have a range of ±10%, with the range widening (in percentage terms) as the levels get closer to the root node.

It is noted that the examples of the preliminary clock tree design shown in FIGS. 2-4 are designs that precede clock tree synthesis. Accordingly, the various modifications to the clock tree may be performed before a computer system executes a clock tree synthesis tool on the preliminary clock tree design. The modification of the clock trees to add clock gating circuits 15 to equalize the gate delays in the various root-to-node paths, as wells as applying uniformity to the fan-outs of the various clock gating circuits 15 may be performed by executing scripts on a computer system prior to performing clock tree synthesis using a clock tree synthesis tool.

Figure 5:
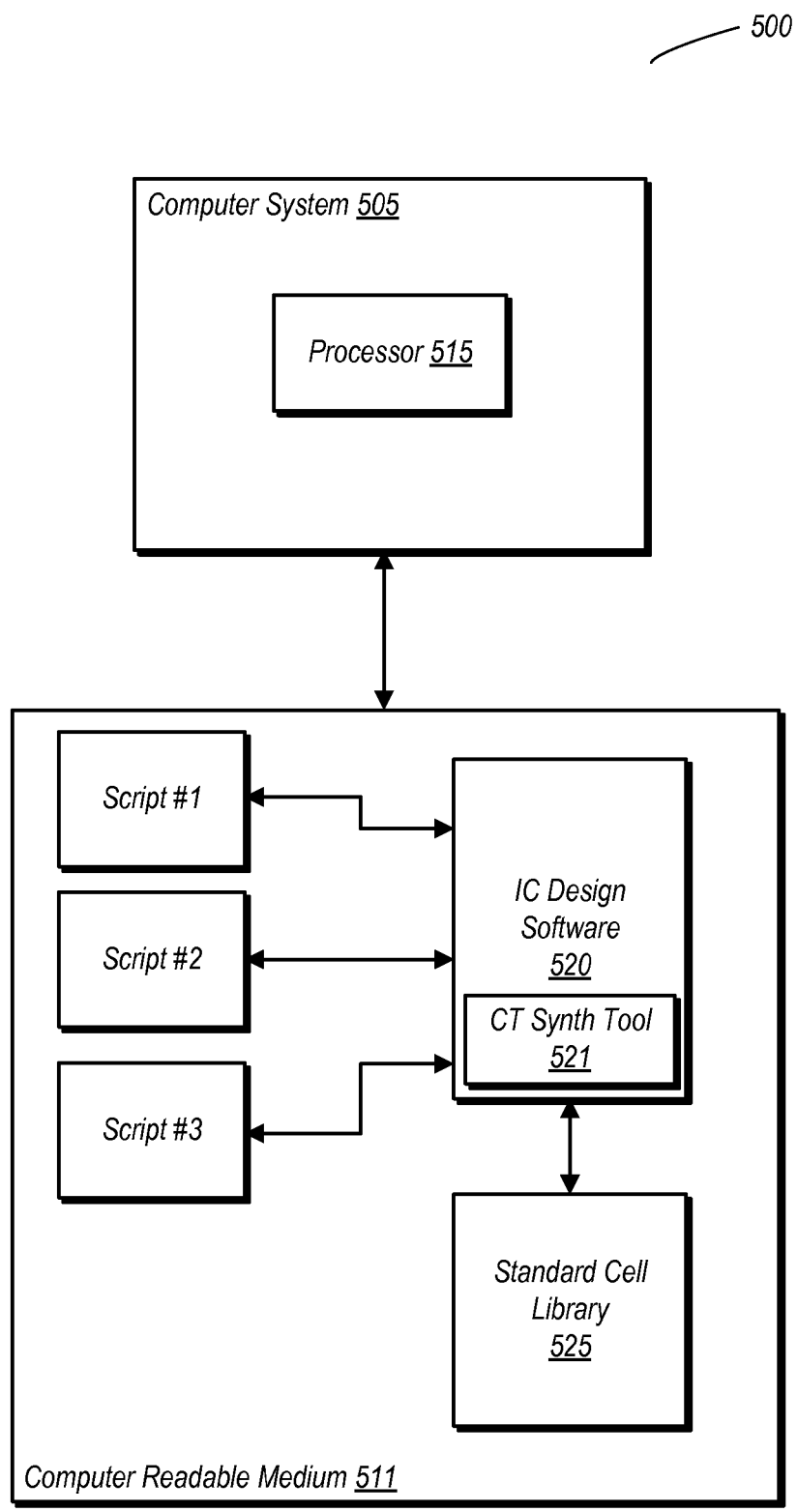
FIG. 5 is a block diagram illustrating one embodiment of a system used to design an IC having a clock tree.

FIG. 5 illustrates one embodiment of a system used to design various embodiments of the clock tree discussed herein. System 500 in the embodiment shown includes a computer system 505 having a processor 515, and a computer readable medium 511. The computer readable medium 511 may be any non-transitory computer readable medium, such as flash memory, hard disk storage, random access memory (RAM), read-only memory (ROM), and so on. In the embodiment shown, computer readable medium 511 includes a number of scripts stored thereon, along with IC design software 520 (which includes a clock tree synthesis tool 521) and a standard cell library.

The various scripts stored on computer readable medium 511 may be executed by processor 515 to generate and modify the preliminary clock design. This may include executing a script to equalize the number of gate delays in each root-to-leaf path by adding clock gating circuits as discussed above. Another script may be executed to ensure that the fan-out for each clock gating circuit is within a specified range for that particular level. In some cases, these scripts may be executed in iterations if extra branches/paths are added to comply with the fan-out requirements of the design. These scripts may also enforce rules to prevent the addition of buffers and/or inverters to the preliminary clock tree design to ensure that all gate delays are provided by clock gating circuits. Yet another script may be executed to configure selected ones of the clock gating circuits to be always enabled whenever the IC is operating and/or voltage is provided to the various functional circuits to be fed by the clock tree.

After the preliminary clock tree design is complete, IC design software 520 may invoke the clock tree synthesis tool 521. Using the preliminary clock tree design, execution of the clock tree synthesis tool 521 con processor 515 of computer system 505 may result in a synthesized clock tree design. During execution of the clock tree synthesis tool, various standard cells from standard cell library 525 may be accessed in order to synthesize the clock gating circuits 15. The standard cell library may include a number of standard logic cells such as AND gates, OR gates, buffers, inverters, flip-flops, and so on. Standard cells for more complex circuitry may also be included in standard cell library 525. In some embodiments, standard cell library 525 may include standard cells for fully design clock gating circuits. Furthermore, in some embodiments, the standard cells in standard cell library may specify additional details regarding the design of a corresponding circuit, such as a transistor level implementation.

Upon completion of the clock tree synthesis of the clock tree design, additional functions may be performed by IC design software 520. These functions may include (but are not limited to) netlist generation, routing, circuit design (if not previously specified), and incorporation of the clock tree design into the overall design of the IC.

Figure 6:
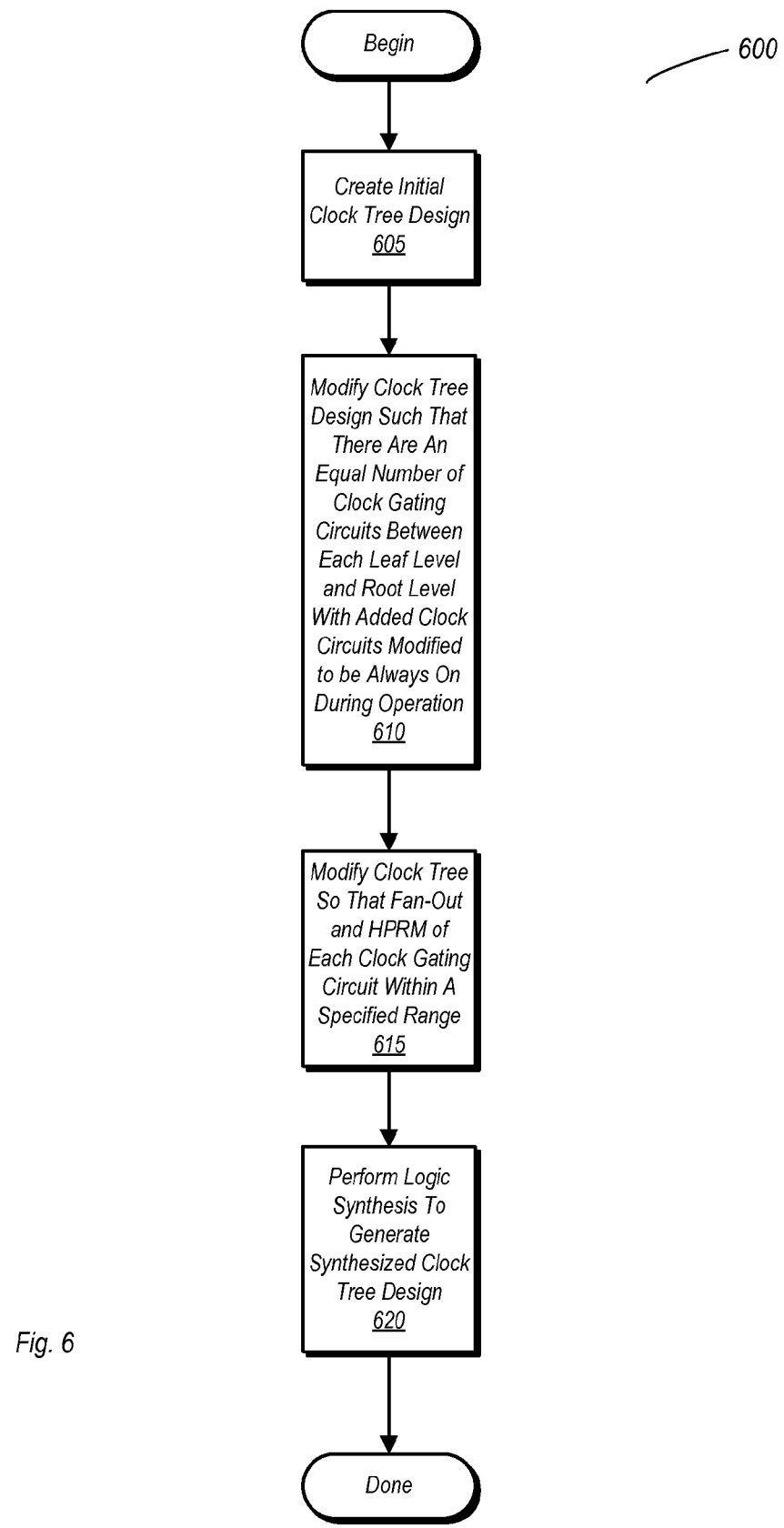
FIG. 6 is a flow diagram illustrating one embodiment of a method for designing a clock tree for an IC.

FIG. 6 is a flow diagram illustrating one embodiment of a method for designing a clock tree for an IC. Method 600 as discussed herein may be executed to design any of the various embodiments of a clock tree discussed above, as well as embodiments not explicitly discussed herein.

Method 600 begins with the creation of an initial clock tree design (block 605). The initial design may include a number of paths between a root node and a number of leaf nodes, through various branches. After completion of the initial, preliminary design, the clock tree may be modified such that there are an equal number of clock gating circuits between each leaf level clock gating circuit and a root level clock gating circuit (block 610). This may be accomplished by executing a script such as that discussed above with reference to FIG. 5. This modification may also include arranging added clock gating circuits such that they remain always active during operation. "During operation" as used herein may be defined as when the IC as a whole is operating, or when the supply voltage node couple to provide power to the clock gating circuits is energized and at a specified voltage. Block 610 may also be performed by executing a script, and may include specifying the selected clock gating circuits to have their respective enable inputs tied to a fixed voltage (e.g., Vdd, ground, etc., depending on the active level of the enable inputs).

The preliminary clock tree design may be further modified such that the fan-out and half of rectangle's perimeter (HRPM) of each clock gating circuit falls within a specified range (block 615). The specified range may vary from one level of the clock tree to another, e.g., the specified range may be different for the leaf level clock gating circuits than for the intermediate level clock gating circuit immediately above the leaf level. The HRPM may be used to ensure that each clock gating circuit is placed physically close to the loads to which it is coupled, e.g., within a range as based on the perimeter of a surrounding rectangle. As with block 610, block 615 may be performed by executing a script on computer system. Furthermore, although not explicitly shown in FIG. 6, additional iterations of block 610 and 615 may be performed in order to ensure that the corresponding requirements for each of these steps are met.

Upon completion of the preliminary clock design, clock tree synthesis is then performed to generate a synthesized clock tree design (block 620). The synthesized clock tree design may be a full logic design of the clock tree, although additional aspects thereof (e.g., netlists, transistor level design, etc.) may also be specified depending on the software used to perform the synthesis. The clock tree synthesis may be performed by executing a clock tree synthesis tool on a computer system.

Figure 7:
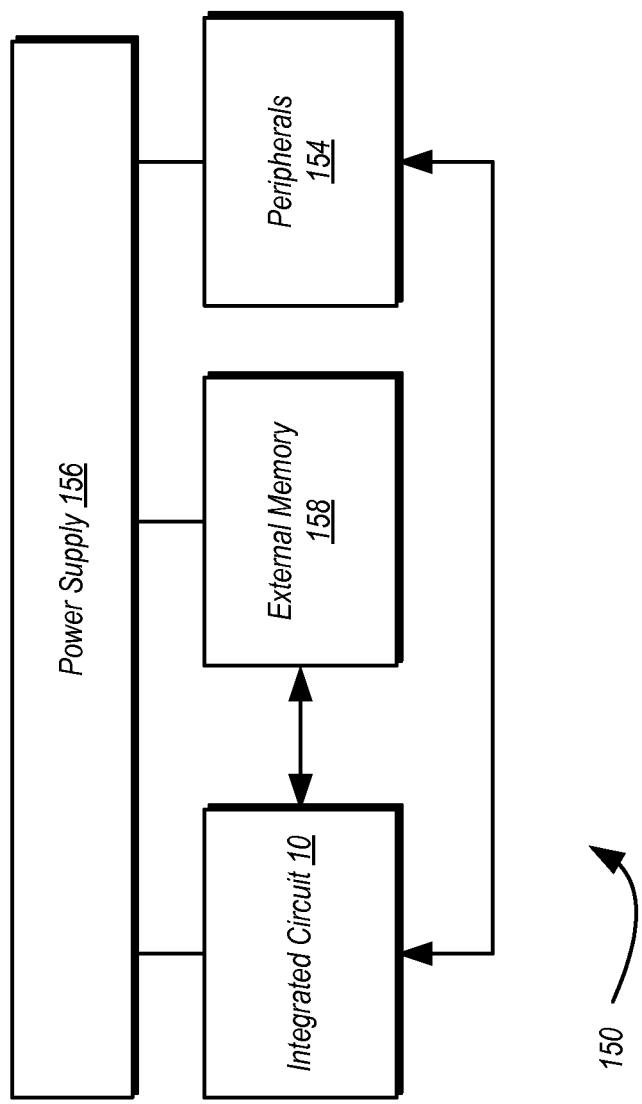
FIG. 7 is a block diagram of one embodiment of an exemplary system.

Turning next to FIG. 7, a block diagram of one embodiment of a system 150 is shown. In the illustrated embodiment, the system 150 includes at least one instance of an integrated circuit 10 coupled to external memory 158. The integrated circuit 10 may include a memory controller that is coupled to the external memory 158. The integrated circuit 10 is coupled to one or more peripherals 154 and the external memory 158. A power supply 156 is also provided which supplies the supply voltages to the integrated circuit 10 as well as one or more supply voltages to the memory 158 and/or the peripherals 154. In some embodiments, more than one instance of the integrated circuit 10 may be included (and more than one external memory 158 may be included as well).

The peripherals 154 may include any desired circuitry, depending on the type of system 150. For example, in one embodiment, the system 150 may be a mobile device (e.g. personal digital assistant (PDA), smart phone, etc.) and the peripherals 154 may include devices for various types of wireless communication, such as WiFi, Bluetooth, cellular, global positioning system, etc. The peripherals 154 may also include additional storage, including RAM storage, solid-state storage, or disk storage. The peripherals 154 may include user interface devices such as a display screen, including touch display screens or multitouch display screens, keyboard or other input devices, microphones, speakers, etc. In other embodiments, the system 150 may be any type of computing system (e.g. desktop personal computer, laptop, workstation, tablet, etc.).

The external memory 158 may include any type of memory. For example, the external memory 158 may be SRAM, dynamic RAM (DRAM) such as synchronous DRAM (SDRAM), double data rate (DDR, DDR2, DDR3, LPDDR1, LPDDR2, etc.) SDRAM, RAMBUS DRAM, etc. The external memory 158 may include one or more memory modules to which the memory devices are mounted, such as single inline memory modules (SIMMs), dual inline memory modules (DIMMs), etc.

Numerous variations and modifications will become apparent to those skilled in the art once the above disclosure is fully appreciated. It is intended that the following claims be interpreted to embrace all such variations and modifications.

What is claimed is:

1. A method comprising:
    processing a preliminary clock tree circuit design for an integrated circuit on a computer system, wherein the preliminary clock tree design includes a root node at which a generated clock is connected, a plurality of intermediate levels, and a leaf level from which the preliminary clock tree circuit design is connected to a plurality of clocked devices in the integrated circuit, wherein the leaf level includes a plurality of leaf level clock gating circuits and at least a portion of the plurality of intermediate levels include clock gating circuits, and wherein the processing comprises:
        modifying the preliminary clock tree circuit design to ensure that each leaf level clock gating circuit has an equal number of the clock gating circuits between that leaf level clock gating circuit and the root node, wherein all gate delays between the root node and the leaf level of the clock tree are provided by clock gating circuits; and
        subsequent to processing the preliminary clock tree design, performing clock tree synthesis of the preliminary clock tree by executing a clock tree synthesis tool on the computer system to generate a synthesized clock tree design; and
    implementing the clock tree circuit design on the integrated circuit.

2. The method as recited in claim 1, further comprising modifying the clock gating circuits in at least one of the intermediate levels and the leaf level to ensure that a fan-out of each of the clock gating circuit at a given level of the preliminary clock tree design is within a respective specified range.

3. The method as recited in claim 2, further comprising:
modifying the leaf level clock gating circuits such that each leaf level clock gating circuit is coupled to at least a first minimum number of clocked devices and no more than a first maximum number of clocked devices; and
modifying clock gating circuits at each of the intermediate levels such that each clock gating circuit at a given one of the intermediate levels is coupled to at least a second minimum number of next level clock gating circuits and no more than a maximum number of next level clock gating circuits.

4. The method as recited in claim 1, further comprising modifying selected ones of the plurality of clock gating circuits to be always active during operation of the integrated circuit.

5. The method as recited in claim 1, further comprising inhibiting placement of inverters or buffers between any two clock gating circuits in a branch of the synthesized clock tree design.

6. The method as recited in claim 1, wherein performing clock tree synthesis comprises selecting the clock gating circuits from a plurality of standard cells such that each of the clock gating circuits at the leaf level are substantially identical to one another.

7. The method as recited in claim 1 wherein performing clock tree synthesis comprises selecting the clock gating circuits from a plurality of standard cells such that each of the clock gating circuits at a given one of the plurality of intermediate levels is substantially identical to other ones of the clock gating circuits at the given one of the plurality of intermediate levels.

8. A non-transitory computer readable medium having program instructions stored thereon that, if executed, cause a computer to:
process a preliminary clock tree circuit design for an integrated circuit on a computer system, wherein the preliminary clock tree design includes a root node at which a generated clock is connected, a plurality of intermediate levels, and a leaf level from which the preliminary clock tree circuit design is connected to a plurality of clocked devices in the integrated circuit, wherein the leaf level includes a plurality of leaf level clock gating circuits and at least a portion of the plurality of intermediate levels include clock gating circuits, and wherein the processing comprises:
modifying the preliminary clock tree circuit design to ensure that each leaf level clock gating circuit has an equal number of the clock gating circuits between that leaf level clock gating circuit and the root node, wherein all gate delays between the root node and the leaf level of the clock tree are provided by clock gating circuits; and
subsequent to processing the preliminary clock tree design, perform clock tree synthesis of the preliminary clock tree by causing the computer system to execute a clock tree synthesis tool to generate a synthesized clock tree design; and
implement the clock tree design on the integrated circuit.

9. The computer readable medium as recited in claim 8, wherein the instructions stored on the computer readable medium include a first script that, when executed by the computer system, modify the clock gating circuits in at least one of the intermediate levels and the leaf level to ensure that a fan-out of each of the clock gating circuit at a given level of the preliminary clock tree design is within a respective specified range.

10. The computer readable medium as recited in claim 9, wherein executing the first script comprises:
modifying the leaf level clock gating circuits such that each leaf level clock gating circuit is coupled to at least a first minimum number of clocked devices and no more than a first maximum number of clocked devices; and
modifying clock gating circuits at each of the intermediate levels such that each clock gating circuit at a given one of the intermediate levels is coupled to at least a second minimum number of next level clock gating circuits and no more than a maximum number of next level clock gating circuits.

11. The computer readable medium as recited in claim 8, wherein the instructions stored on the computer readable medium include instructions that, when executed by the computer system, modify selected ones of the plurality of clock gating circuits to be always active during operation of the integrated circuit.

12. The computer readable medium as recited in claim 8, wherein the instructions stored on the computer readable medium include instructions that, when executed by the computer system, inhibit placement of inverters or buffers between any two clock gating circuits in a branch of the synthesized clock tree design.

13. The computer readable medium as recited in claim 8, wherein the instructions stored on the computer readable medium include instructions that, when executed by the computer system, select, during performing of the clock tree synthesis, the clock gating circuits from a plurality of standard cells such that each of the clock gating circuits at the leaf level are substantially identical to one another.

14. The computer readable medium as recited in claim 8, wherein the instructions stored on the computer readable medium include instructions that, when executed by the computer system, select, during the clock tree synthesis, the clock gating circuits from a plurality of standard cells such that each of the clock gating circuits at a given one of the plurality of intermediate levels is substantially identical to other ones of the clock gating circuits at the given one of the plurality of intermediate levels.

15. An integrated circuit comprising:
a clock generation circuit configured to generate a clock signal;
a plurality of clocked circuits coupled to receive the clock signal; and
a clock tree comprising a plurality of clock gating circuits including a root level clock gating circuit at a root level of the clock tree, a plurality of intermediate level clock gating circuits in a plurality of intermediate levels of the clock tree, and a plurality of leaf level clock gating circuits at a leaf level of the clock tree, wherein each of the plurality of clocked circuits is coupled to receive the clock signal from a correspondingly coupled one of the leaf level clock gating circuits;
wherein the plurality of clock gating circuits is arranged such that each leaf level clock gating circuit has an equal number of the plurality of clock gating circuits between itself and a root node of the clock tree, and is further arranged such that a fan-out range for the plurality of leaf level clock gating circuits is narrower than a fan-out range for clock gating circuits at preceding intermediate level, and wherein a fan-out range for clock gating circuits of at least one intermediate level of the clock tree are narrower than a fan-out range for clock gating circuits of at least one other intermediate level that is closer to the root level of the clock tree.

16. The integrated circuit as recited in claim 15, wherein a number of the clock gating circuits in at least one of the intermediate levels and the leaf level are within a respective specified range.

17. The integrated circuit as recited in claim 16, wherein each of the clock gating circuits at the leaf level are coupled to provide the clock signal to at least a first minimum number of clocked devices and no more than a first maximum number of clocked devices, and wherein each of the clock gating circuits at a given intermediate level is coupled to provide the clock signal to a second minimum number of next level clock gating circuits and no more than a second maximum number of next level clock gating circuits.

18. The integrated circuit as recited in claim 15, wherein selected ones of the plurality of clock gating circuits are configured to remain always active during operation of the integrated circuit.

19. The integrated circuit as recited in claim 15, wherein the clock tree excludes inverters coupled between any two clock gating circuits in any branch of the clock tree, and further excludes buffers coupled between any two clock gating circuits in any branch of the clock tree.

20. The integrated circuit as recited in claim 15, wherein each of the clock gating circuits at a given level of the clock tree are substantially identical to other ones of the clock gating circuits in the given level.

* * * * *